Figure 1:
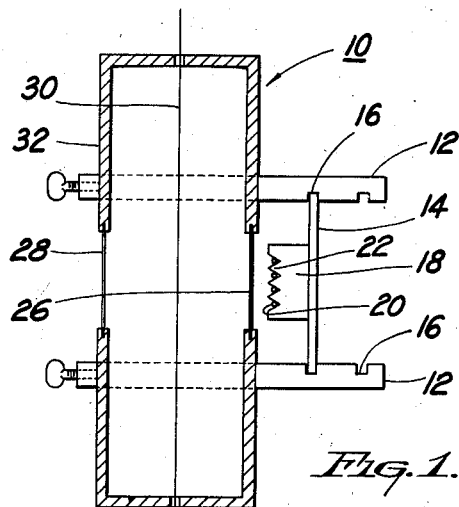

June 3, 1958     C. HENDEE ET AL     2,837,659
APPARATUS FOR CALIBRATING ENERGY SENSITIVE DEVICES
Filed Nov. 9, 1955                           2 Sheets-Sheet 1

INVENTORS
CHARLES HENDEE
SAMUEL FINE
BY
AGENT.

June 3, 1958

C. HENDEE ET AL 2,837,659

APPARATUS FOR CALIBRATING ENERGY SENSITIVE DEVICES

Filed Nov. 9, 1955

2 Sheets-Sheet 2

INVENTORS
CHARLES HENDEE
SAMUEL FINE
BY

AGENT.

United States Patent Office 2,837,659
Patented June 3, 1958

2,837,659
APPARATUS FOR CALIBRATING ENERGY SENSITIVE DEVICES

Charles Hendee, Hartsdale, and Samuel Fine, New York, N. Y., assignors to North American Philips Company, Inc.

Application November 9, 1955, Serial No. 545,990

7 Claims. (Cl. 250—83.6)

This invention relates to a method and apparatus for calibrating energy sensitive devices and their associated electrical circuitry. More particularly, the invention relates to the use of radioactive isotopes as source materials emitting X-radiation of known energy into an energy sensitive device so that the device may be calibrated.

Energy sensitive devices may be operated so that information concerning the spectral content, i. e. photon energy, of incident radiation may be determined by such devices. In addition, these devices may be operated such that the number of pulses produced in the output circuit associated with such devices is proportional to the intensity of the incident radiant energy. Inasmuch as these devices and their associated circuitry are not absolute instruments their calibration is necessary to insure the accuracy of the information provided by the equipment. An X-ray source of known and constant energy is necessary to calibrate the equipment. Such an X-ray source is conveniently provided by a radioactive isotope which emits radiations of known value into an energy sensitive device operated to produce a response therein proportional to the photon energy or intensity of the incident radiation. In order to calibrate the device over a wide range of energy it is necessary to provide a plurality of sources having different spectral energies. When the sources are used sequentially, the calibration of the detector is erratic because external operating conditions are not uniform. For instance, there are instabilities in the line voltages, voltage fluctuations across the detector and in the output circuitry and there are changes in amplifier gain and variations in the operation of a pulse height analyzer.

It is an object of this invention, therefore, to standardize the effect of the external operating conditions of the detector during its calibration.

A further object is to provide a multiple source holder for a plurality of radioisotopes each issuing characteristic X-ray energy.

An additional object is to provide a compact and portable source holder including means for preventing the mutual fluorescence of radioactive isotopes mounted thereon.

Figure 2:
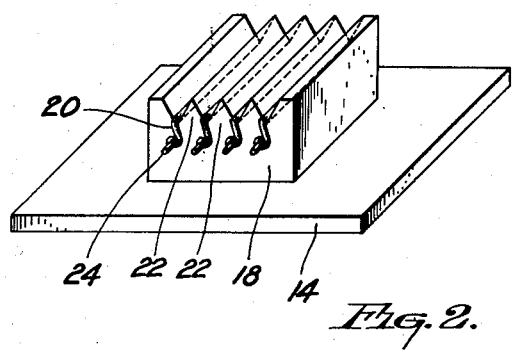
Figure 3:
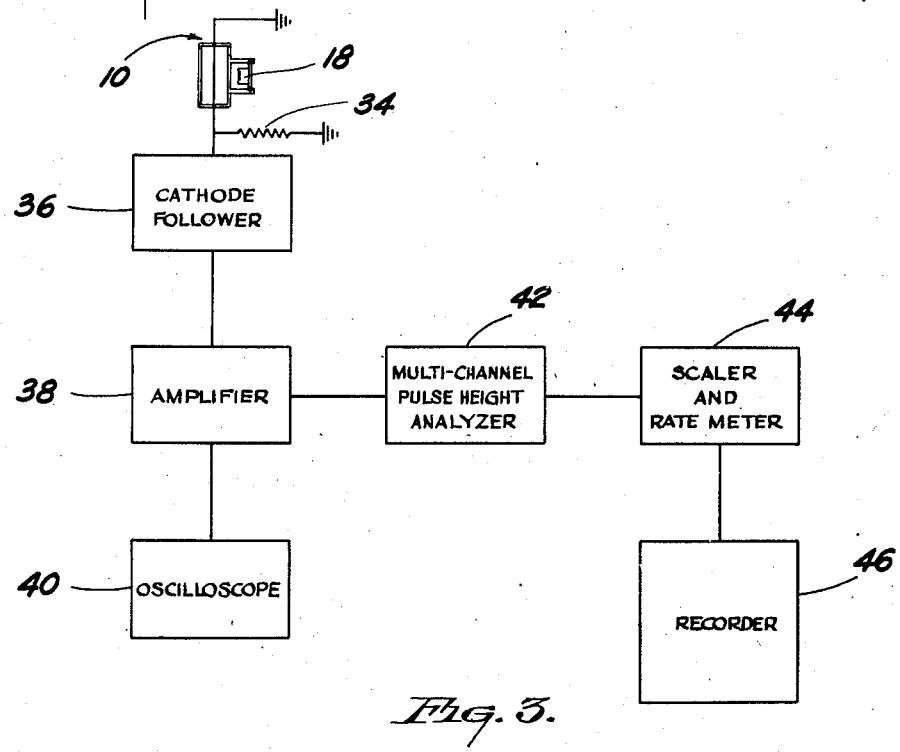
Figure 4:
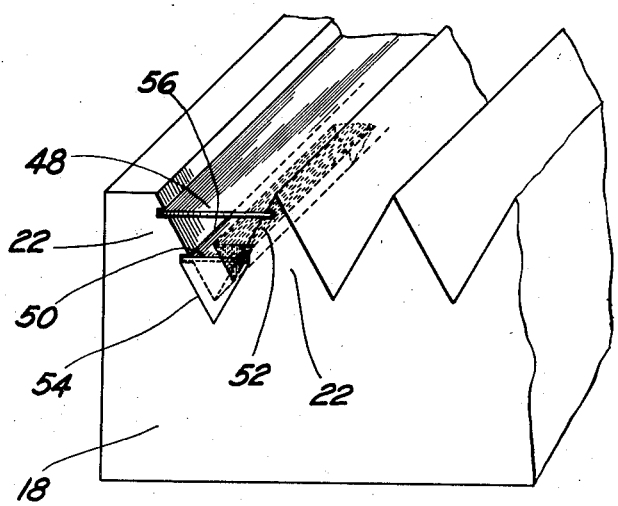
Figure 5:
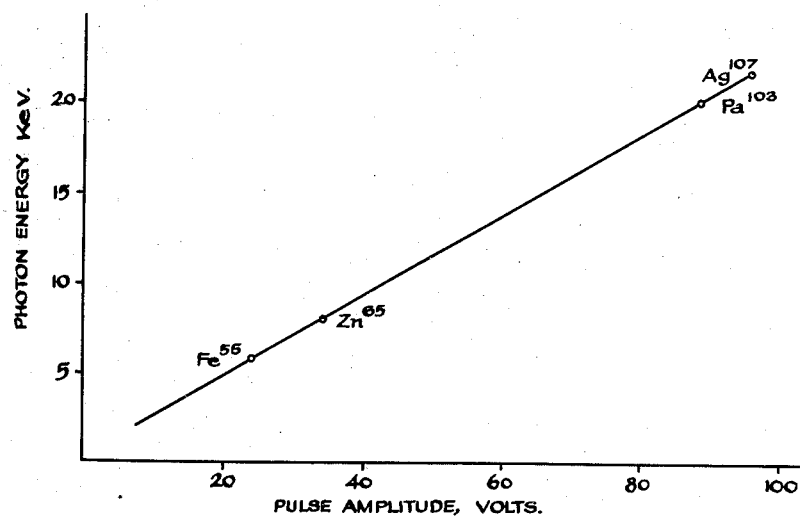

The above and other features, objects and advantages of the present invention will be fully understood from the following description considered in connection with the accompanying illustrative drawing in which;

Fig. 1 is a view in cross section of a radiation detector and a multiple source holder, Fig. 2 is a perspective view of a multiple source holder, Fig. 3 is a block diagram of a radiation detector, source holder and associated electrical circuitry, Fig. 4 is a perspective view of a further embodiment of the multiple source holder shown in Fig. 2, and Fig. 5 is a graph of an energy calibration of a detector and associated circuitry by a multiple source holder having four radioactive isotopes thereon.

Referring to the drawings, the calibration of an energy sensitive device, generally referred to by numeral 10, and its associated circuitry is accomplished by subjecting the detecting device to X-radiation emitted from radioactive isotopes adjacent the detector. Fig. 1 shows a proportional counter as one of the energy sensitive devices which may be used in the invention. The proportional counter has a pair of spaced clamps 12 mounted on a cylindrically-shaped shell 32 which constitutes the cathode of the proportional counter. The clamps 12 have oppositely disposed grooves 16 for receiving the flanged base member 14 of a multiple source holder 18. In this manner the holder can be conveniently moved to several positions in precise relationship to the detector although it is not necessary in carrying out the invention for the holder to be held in fixed spaced relationship to the detecting device. A plurality of radioactive isotopes 20 are mounted in spaced relationship on the holder 18 as illustrated in Fig. 1. As shown in Fig. 2, the radioactive isotopes 20 may be in the form of wires disposed between projection 22 formed on the holder 18. Each of the radioactive materials is constituted of a different X-ray emitting isotope and is spaced from the other by projections 22 to prevent their mutual fluorescence. Aluminum as a holder is suitable for this purpose when the desired spectrum is in the 5–100 kev. region. In the case where the radioactive material may be formed as a wire it can be conveniently located between projections 22 and secured by its ends to rod-shaped projections 24 extending from the sides of the holder 18. The radioactive materials may be made of compacted powders secured in the indentations formed by the saw-like projections 22, or the isotopes may be electrolytically deposited as a layer on the surface of wires which in turn can be rigidly secured to the holder 18.

The X-radiation emitted by isotopes 20 is directed into detecting device 10 through window 26. The window 26 is made of X-ray transparent material preferably beryllium so that the incident X-ray energy may be almost wholly absorbed by the sensitive volume of the detector. An exit window 28 also constituted of X-ray transparent materials is provided in the cathode shell opposite window 26 so that unabsorbed radiation can escape from the sensitive volume of the detector. The sensitive volume of the counter is constituted by an ionizable gas usually a rare gas such as helium or argon.

Normally the isotopes which emit only X-rays and no beta or gamma radiations are selected for use in the multiple-source holder. Of these the materials having the longer half-life are preferable. Examples of suitable isotopes issuing only pure X-rays are $Ca^{41}$, $Fe^{55}$, $Ni^{59}$, $Mo^{93}$, $Tc^{97}$, and $Dy^{159}$. The presence of beta or gamma radiations need not be an interfering factor in many applications with other radioactive isotopes because the betas may be filtered easily by metal foils or plastic films and the effect of gammas may be minimized with electronic discrimination and the use of thin sources. Where the radioactive isotopes emit all of the characteristic X-rays of the element concerned, it is possible to improve the degree of monochromatization of these sources by the use of filters, as shown in Fig. 4, which selectively absorb the unwanted radiation. Filters 48 and 50 in the form of thin foils can be incorporated in the source holder to also serve as a protective window to contain radioactive isotopes 52 and prevent it from contaminating the atmosphere. The thin cover 50 may be welded along the edges 54 and 56 or otherwise fastened to holder 18 sandwiching the emitting material 52 between the foil 50 and holder 18. An example of such a type of "sandwich" holder would be use of palladium foil over K-capture cadmium 109, which decays to silver with the subsequent emission of silver K X-rays. The palladium (k-absorption edge=24.35 kev.) selectively absorbs the $AgK_\beta=24.94$ kev. component and allows the essentially monochromatic $AgK\alpha_1 = 22.16$ kev. and $K\alpha_2 = 21.55$ kev. components to be transmitted. To provide for additional monochromatization of the X-radiation, ruthenium may be used as a cover in conjunction with the palladium. Ruthenium selectively transmits only the $AgK\alpha_2$ line. Palladium and ruthenium layers of the order of .001 inch thick are suitable for this purpose.

Another embodiment involves the use of nickel foil over the isotope $Zn^{65}$ to absorb the $K_\beta$ component of the Cu K X-rays that are emitted.

A potential difference sufficient to produce proportional counting action when the gas filling is ionized is impressed across anode wire 39 and cathode shell 32 by a means (not shown), the anode being at the higher potential. The gas filling is ionized by the incident X-radiation from the isotopes and current pulses are produced in the output circuit by the absorption of the monochromatic energy in the gas and subsequent gas amplification. The current pulses are converted into voltage pulses by resistor 34 (Fig. 3). The voltage pulses are amplified by amplifier 38 connected to resistor 34 through a cathode follower 36. The amplified pulses may be viewed directly by applying the amplified pulses to an oscilloscope 40. In order to permanently record the information obtained, the voltage pulses may be alternately and preferably determined by segregating the pulses according to their amplitude by means of a multi-channel pulse height analyzer 42 and counting the number of pulses in each interval by means of a scaler and rate meter 44 and a recorder 46.

In an energy linearity calibration of a proportional counter using $Fe^{55}$, $Zn^{65}$, $Pd^{103}$ and $Ag^{109}$ as the X-ray emitting materials, the amplitude of the pulses in volts produced by the simultaneous irradiation of the gas filling of the counter were recorded and plotted against the photon energy in kev. as shown in Fig. 5. Other radioisotopes may also be used in substitution for or in addition to those set forth above to further calibrate the detector and its associated circuitry. The plot in Fig. 5 shows that the detector and associated circuitry was linear over the range shown.

The response of the detector and its associated equipment to changes in intensity can also be calibrated by using radioactive isotopes which have substantially constant disintegration rates. Intensities are attenuated by filters which reduce the rate of the photons emitted by a given amount.

By "energy sensitive" devices referred to in the specification and as used in the appended claims we mean devices capable of detecting electromagnetic particles or waves and indicating the process of detection by means of a response which is proportional to the photon energy of said waves or particles. Examples of such devices include but are not limited to proportional counters, scintillation counters, ionization chambers and bubble chambers and other similar devices.

While we have shown and described the preferred embodiment of our invention, it will be understood that the latter may be embodied otherwise than as herein specifically illustrated or described and that in the illustrated embodiment certain changes in the details of construction and in the arrangements of parts may be made without departing from the underlying idea or principle of the invention within the scope of the appended claims.

What we claim is:

1. In combination a source holder, a plurality of X-ray emitting radioactive isotopes spatially mounted on said source holder, spacing means between said isotopes, said spacing means being constituted of X-ray opaque materials for preventing the mutual fluorescense of said isotopes, each of said isotopes simultaneously emitting radiation of characteristic energy along given paths, and an energy sensitive device so disposed relative to the holder to detect the X-radiation.

2. In combination, a source holder constituted of X-ray opaque material having a plurality of grooves on a surface thereof, radioactive isotopes mounted in said grooves, each of said isotopes simultaneously emitting radiation of characteristic energy along given paths, and a filter mounted on said holder to intercept the X-radiation from at least one radioactive isotope and transmit X-radiation of desired energy therefrom.

3. In combination, a source holder constituted of X-ray opaque material having a plurality of grooves on a surface thereof, radioactive isotopes mounted in said grooves, each of said isotopes simultaneously emitting radiation of characteristic energy along given paths, at least one of said isotopes being constituted of given paths, at least one of said isotopes being constituted of $Cd^{109}$ issuing characteristic X-rays, and a filter mounted on said holder to intercept the X-radiation from at least said $Cd^{109}$ isotope and transmit X-radiation of desired energy therefrom, said filter material being selected from the group consisting of palladium and ruthenium.

4. In combination a source holder, a plurality of X-ray emitting radioactive isotopes spatially mounted on said source holder, spacing means between said isotopes, said spacing means being constituted of X-ray opaque materials for preventing the mutual fluorescence of said isotopes, each of said isotopes simultaneously emitting characteristic X-radiation along given paths, said isotopes being selected to provide X-radiation of different energy over a given spectrum, an energy sensitive device in said X-ray path and disposed to detect the X-radiation, said energy sensitive device comprising spaced electrodes and an ionizable gas between said electrodes, the X-radiation being substantially absorbed in the ionizable gas, means for impressing a voltage difference across the electrodes in the proportional counting region for producing output pulses on one of the electrodes, and an output circuit associated with said one electrode for indicating the output pulses, said output pulses having an amplitude in volts proportional to the photon energy of said incident X-radiation.

5. In combination a source holder, a plurality of X-ray emitting radioactive isotopes mounted on said source holder, means for shielding said isotopes from one another, each of said isotopes simultaneously issuing essentially monochromatic X-radiation of different energy along given paths, and a proportional counter adjustably mounted in spaced relationship from said source holder, said counter comprising a shell-like cathode, a centrally disposed anode wire in said cathode, and an ionizable gas filling between said anode and cathode, means for impressing a voltage across said counter for producing output pulses in the proportional counting region, and an output circuit for measuring said pulses, said cathode having apertures on opposite walls thereof, X-ray transparent materials mounted in said apertures, said X-rays being directed through one of said windows, said X-rays being substantially absorbed in said gas filling, the other window being likewise positioned on said paths for transmitting any unabsorbed radiation from said counter.

6. The combination as claimed in claim 5 in which longitudinal grooves are formed on the surface of a source holder constituted of an aluminum body, projections between said grooves having a thickness sufficient for absorbing 100 kev. energy, said radioactive isotopes emitting energy in the range between 5 and 100 kev., said isotopes having long half lifes and substantially constant disintegration rates.

7. A source holder comprising a plurality of X-ray emitting radioactive isotopes spatially mounted on said source holder, and spacing means between said isotopes, said spacing means being constituted of X-ray opaque materials for preventing the mutual fluorescence of said isotopes, each of said isotopes simultaneously emitting radiation of characteristic energy along given paths.

No references cited.